(12) United States Patent
Zou et al.

(10) Patent No.: US 11,860,411 B2
(45) Date of Patent: Jan. 2, 2024

(54) SUPER-COMPACT ARRAYED WAVEGUIDE GRATING (AWG) WAVELENGTH DIVISION MULTIPLEXER BASED ON SUB-WAVELENGTH GRATING

(71) Applicant: Southwest Jiaotong University, Chengdu (CN)

(72) Inventors: Xihua Zou, Chengdu (CN); Changjian Xie, Chengdu (CN); Xiaojun Xie, Chengdu (CN); Wei Pan, Chengdu (CN); Lianshan Yan, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 17/980,607

(22) Filed: Nov. 4, 2022

(65) Prior Publication Data

US 2023/0288636 A1     Sep. 14, 2023

(30) Foreign Application Priority Data

Mar. 14, 2022   (CN) .......................... 202210247517.5

(51) Int. Cl.
*G02B 6/12* (2006.01)

(52) U.S. Cl.
CPC ................... *G02B 6/12011* (2013.01); *G02B 2006/12164* (2013.01)

(58) Field of Classification Search
CPC .......... G02B 6/14; G02B 6/305; G02B 6/124; G02B 6/12007; G02B 6/2938; G02B 6/29304; G02B 2006/12164
See application file for complete search history.

(56) References Cited

U.S. PATENT DOCUMENTS 4,715,027 A * 12/1987 Mahapatra ......... G02B 6/12007
                                                    385/36
4,784,935 A * 11/1988 Ehrfeld .............. G02B 6/29328
                                                    378/34

(Continued)

FOREIGN PATENT DOCUMENTS

CN        112946815 A       6/2021

OTHER PUBLICATIONS

Xingzi Zhu, Research on simulation of integrated array waveguide grating and its chip layout design, A Thesis Submitted in Fully Fulfillment of the Requirement for the Degree of Master of Engineering, 2019, pp. 1-60, Huazhong University of Science and Technology.

(Continued)

*Primary Examiner* — Ryan A Lepisto
*Assistant Examiner* — Erin D Chiem
(74) *Attorney, Agent, or Firm* — Bayramoglu Law Offices LLC

(57) ABSTRACT

A super-compact arrayed waveguide grating (AWG) wavelength division multiplexer based on a sub-wavelength grating is provided and includes an input waveguide, a first planar waveguide, an arrayed waveguide, a second planar waveguide, and the output waveguide that are sequentially connected. The input waveguide has 1 port, and the output waveguide has 8 ports. The arrayed waveguide includes 50 equivalent uniform strip waveguides with the same length difference, and each of the equivalent uniform strip waveguides is configured as a sub-wavelength grating structure, thereby forming the effect of increasing group refractive index or transmission delay based on a slow light effect. The 8 channels with a channel spacing of 200 GHz have the minimum adjacent channel crosstalk of less than −27 dB, and the overall size is within 300×230 μm². In the multiplexer, the overall integration size of the device is reduced by an order of magnitude.

5 Claims, 3 Drawing Sheets

(56) References Cited

U.S. PATENT DOCUMENTS

| 6,455,842 | B1* | 9/2002 | Pouteau | G01J 3/36 |
| | | | | 385/14 |
| 6,678,429 | B2* | 1/2004 | Mossberg | G02B 5/32 |
| | | | | 359/569 |
| 6,829,417 | B2* | 12/2004 | Greiner | G02B 6/12007 |
| | | | | 359/569 |
| 2002/0081061 | A1* | 6/2002 | He | G02B 6/12007 |
| | | | | 385/24 |
| 2004/0036933 | A1* | 2/2004 | Yankov | G02B 6/12007 |
| | | | | 359/34 |
| 2005/0018951 | A1* | 1/2005 | Mossberg | G02B 6/42 |
| | | | | 385/14 |

OTHER PUBLICATIONS

Antoine Gervais, et al., Design of Slow-Light Subwavelength Grating Waveguides for Enhanced On-Chip Methane Sensing by Absorption Spectroscopy, IEEE Journal of Selected Topics in Quantum Electronics, 2019, vol. 25, No. 3, 5200308.

Jaegyu Park, et al., Performance improvement in silicon arrayed waveguide grating by suppression of scattering near the boundary of a star coupler, Applied Optics, 2015, pp. 5597-5602, vol. 54, No. 17.

Qi Han, et al., Polarization-insensitive silicon nitride arrayed waveguide grating, Optics Letters, 2019, pp. 3976-3979, vol. 44, No. 16.

Kuanping Shang, et al., Low-Loss Compact Silicon Nitride Arrayed Waveguide Gratings for Photonic Integrated Circuits, IEEE Photonics Journal, 2017, vol. 9, No. 5, 6601805.

* cited by examiner

SUPER-COMPACT ARRAYED WAVEGUIDE GRATING (AWG) WAVELENGTH DIVISION MULTIPLEXER BASED ON SUB-WAVELENGTH GRATING

CROSS REFERENCE TO THE RELATED APPLICATIONS

This application is based upon and claims priority to Chinese Patent Application No. 202210247517.5, filed on Mar. 14, 2022, the entire contents of which are incorporated herein by reference.

TECHNICAL FIELD

The present invention relates to the technical field of dense wavelength division multiplexing, particularly to a super-compact arrayed waveguide grating (AWG) wavelength division multiplexer based on a sub-wavelength grating.

BACKGROUND

AWG is a type of angular-dispersion passive optical integrated device, which includes an input waveguide, input planar waveguide, arrayed waveguide, output planar waveguide, and output waveguide. At present, the silicon-based AWG overcomes the problem that the size of the device using silicon nitride material or silicon dioxide material is too large to achieve high-density integration. Moreover, compared to the wavelength division multiplexers (such as microring, Mach-Zehnder interferometer (MZI), and others) with other structures, the AWG has a simpler structure, higher design flexibility, and larger wavelength multiplexing number in theory. Its working principle is that when the wide-spectrum light enters the first planar waveguide through the input waveguide, the light beam will be diffracted inside and then enter the arrayed waveguide. Since the adjacent arrayed waveguides have a length difference of $\Delta L$, the light beam will produce a phase difference inside the arrayed waveguide and interfere in the second planar waveguide, and the light of different wavelengths will be focused on different output waveguides.

At present, in the design of AWG using silicon-based optical waveguide, the main index parameters include loss, crosstalk, number of channels, channel spacing, and the overall size of the device. There is much research being done on the 8-channel AWG. Representative papers on the compact AWG include: 1) Park J, Kim G, Park H, et al. Performance improvement in silicon arrayed waveguide grating by suppression of scattering near the boundary of a star coupler[J]. Applied Optics, 2015, 54(17):5597; and 2) Han Q, J St-Yves, Chen Y, et al. Polarization-insensitive silicon nitride arrayed waveguide grating[J]. Optics Letters, 2019, 44(16):3976; 3) Shang K, Pathak S, Qin C, et al. Low-loss compact silicon nitride arrayed waveguide gratings for photonic integrated circuits[J]. IEEE Photonics Journal, 2017, 9(5):1-5. The above 8-channel AWG papers adopts a traditional three-segment structure. The main problems solved by paper (1) are the crosstalk and loss of the whole device. By adopting a deep-and-shallow etching structure to reduce the generation of multimode as much as possible, the overall size of the device is about 400×240 $\mu m^2$, but its channel spacing is 400 GHz; however, when performance (the channel spacing is upgraded from 400 GHz to 200 GHz) is improved, its size (mainly the length difference between adjacent waveguides required will increase) will significantly increase to 4-6 times, and the area will reach the order of 10 $mm^2$. The problems solved by paper (2) are basically the same as that of paper (1), but the focus is on the interference of polarization. By constructing waveguides, the overall sensitivity of the device to polarization is reduced, and the overall performance of the device is improved; however, due to the use of silicon nitride, the overall structure is approximately 4000×1500 $\mu m^2$, and the area is about the order of 10 $mm^2$. The materials used in papers (3) and (2) are both silicon nitride. By constructing the limited mode of the waveguide structure, the compact design is achieved while improving the performance; whereas, the overall size is about 1800×600 $\mu m^2$, and the area is about the order of 10 $mm^2$. Thus, at present, the compact design of device size is mainly realized by the characteristics of materials (that is, materials with high refractive index contrast, such as silicon). In addition, the methods available are limited.

According to the above analysis, it is still a challenge to improve the integration of the silicon-based AWG wavelength division multiplexer.

SUMMARY

In order to solve the problem that the overall size of the AWG is too large and the integration cannot be improved further by using the uniform waveguide, the present invention provides a super-compact AWG wavelength division multiplexer based on a sub-wavelength grating.

In the present invention, the super-compact AWG wavelength division multiplexer based on the sub-wavelength grating includes an input waveguide, a first planar waveguide, a sub-wavelength grating arrayed waveguide, a second planar waveguide, and an output waveguide that are silicon-based devices and sequentially connected. The input waveguide has 1 port, and the output waveguide has 8 ports. The sub-wavelength grating arrayed waveguide includes 50 strip sub-wavelength gratings with the same length difference $\Delta L$, and each of the strip sub-wavelength gratings is configured as an equivalent uniform waveguide. The first planar waveguide and the second planar waveguide each have a basic structure of a Rowland circle, which includes a circle with a radius of R and an inscribed circle with a radius of R/2, and the two planar waveguides are symmetrically designed.

Further, the width of a strip sub-wavelength grating is 1 and the diffraction order is 10. The distance between adjacent strip sub-wavelength gratings is 1.5 Each of the sub-wavelength gratings is configured as an equivalent uniform strip waveguide, and the group refractive index is significantly increased by using the slow light effect. When the group refractive index increases, a small planar waveguide can be configured to achieve light diffraction and focusing, thus reducing the number of arrayed waveguides required by the structure to finally reduce the overall structure size. The design proposed by the present invention realizes the wavelength division multiplexing function in a small size and obtains a fine channel spacing (such as reducing from 400 GHz to 200 GHz).

The distance between 8 ports of the output waveguide is 1.5 $\mu m$.

Further, the AWG wavelength division multiplexer is configured in a standard silicon on insulator (SOI) wafer design. A substrate and an upper cladding layer are configured with a material of silicon dioxide in a thickness of 2 and a main waveguide grating structure is configured with a material of silicon in a thickness of 220 nm.

Further, the length difference $\Delta L$ of the adjacent strip sub-wavelength gratings is calculated according to the following formula:

$$\Delta L = \frac{m\lambda_0}{n_c},$$

where m denotes a diffraction order of AWG, $\lambda_0$ denotes a central wavelength, and $n_c$ denotes a mode effective refractive index of arrayed waveguides. Additionally, to achieve the low-loss transmission of incident light in the waveguide, the waveguide transverse electric (TE) fundamental mode is adopted in the overall design. However, according to the principle of mode matching, the mode mismatch caused by a sudden change in the width of the waveguide will cause many high-order modes to be excited and phase errors will be introduced. Therefore, a parabolic taper waveguide is introduced at the connection between the strip waveguide and the free propagation region waveguide, which broadens the width of the waveguide, reduces the refractive index difference between the two waveguides, and reduces the introduction of phase error.

Further, the radius R of the planar waveguide formed by the Rowland circle and a diffraction order m of the AWG satisfy the following two formulas:

$$R \geq \frac{d_{io} n_s d_g N_{ch}}{\lambda_0},$$

$$m \leq \frac{\lambda_0 n_c}{N_{ch} \Delta \lambda n_g},$$

where $d_{io}$ denotes a distance between input and output waveguides, $n_s$ denotes a mode effective refractive index of the free propagation region waveguide, $d_g$ denotes a distance of arrayed waveguides, $N_{ch}$ denotes the number of output channels, $\lambda_0$ denotes a central wavelength, $n_c$ denotes a mode effective refractive index of the arrayed waveguides, $\Delta\lambda$ denotes a channel spacing, and $n_g$ denotes a mode group refractive index of the arrayed waveguides.

In addition, according to the requirements of the uniformity of multiple channels, the radius of the free propagation region waveguide is designed as:

$$R \geq \frac{N_{ch} d_{io}}{2\theta_0} \sqrt{\frac{8.686}{L_u}},$$

where $N_{ch}$ denotes the number of output channels; the channel flatness parameter (i.e. non-uniformity degree parameter) $L_u \approx 8.686 \theta_{max}^2/\theta_0^2$, where Gaussian far-field equivalent width $$\theta_0 = \frac{\lambda}{n_s w_g \sqrt{2\pi}},$$

$\theta_{max}$ denotes a far-field diffraction angle, and $w_g$ denotes the equivalent width of arrayed waveguide mode field.

Additionally, there is a fixed product relationship between the radius of the Rowland circle and the diffraction order, and the relationship can be expressed as follows:

$$mR = \frac{d_{io} n_s d_g n_c}{\Delta \lambda n_g}.$$

It can be seen that when the group refractive index $n_g$ increases, the overall mR product decreases. The number of arrayed waveguides required is also reduced, and the overall size of the device is reduced.

The advantages of the present invention are as follows:

1. By designing a super-compact arrayed waveguide based on the sub-wavelength grating and using the slow light effect of the sub-wavelength grating, the overall structure of the AWG is greatly reduced, the overall size is controlled within 300×230 µm$^2$, and the required area is less than the order of 1 mm$^2$ (0.7 mm$^2$).

2. On the premise of ensuring the super-compact structure, the 8-channel output in the channel spacing of 200 GHz is realized.

3. The super-compact AWG wavelength division multiplexer provided by the present invention has important applications in optical communication and optical signal processing and wavelength division multiplexing/demultiplexing systems.

Figure 1:
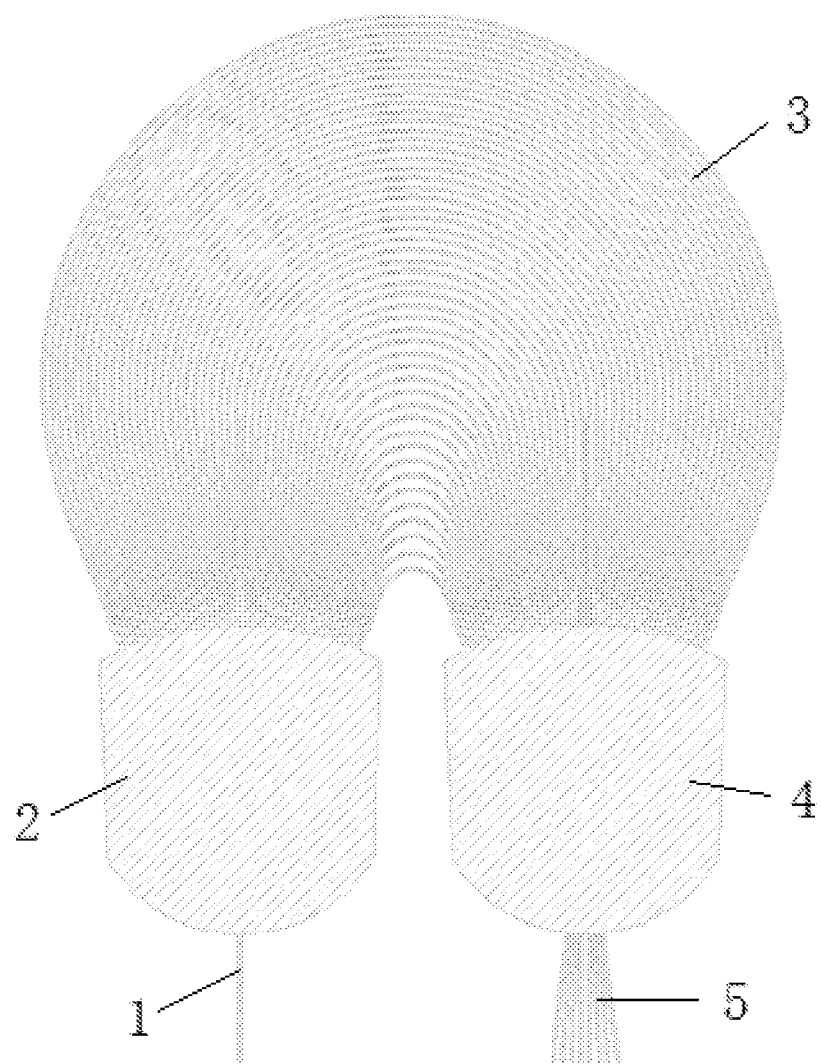
FIG. 1 is a schematic diagram showing the structure of a super-compact AWG wavelength division multiplexer based on a sub-wavelength grating according to the present invention.

Reference numerals in FIG. 1: 1—input waveguide; 2—first planar waveguide; 3—arrayed waveguide; 4—second planar waveguide; 5—output waveguide.

Figure 2:
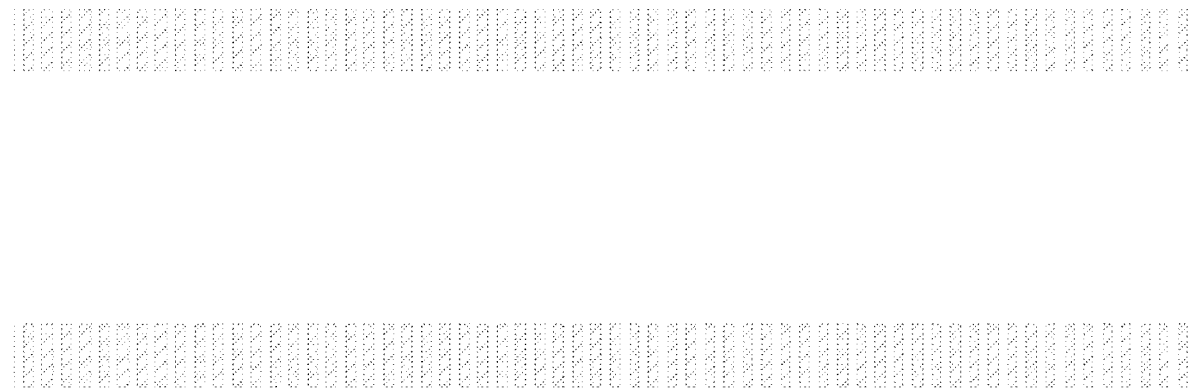

FIG. 2 is a schematic diagram showing the structure of a sub-wavelength grating arrayed waveguide.

Figure 3:
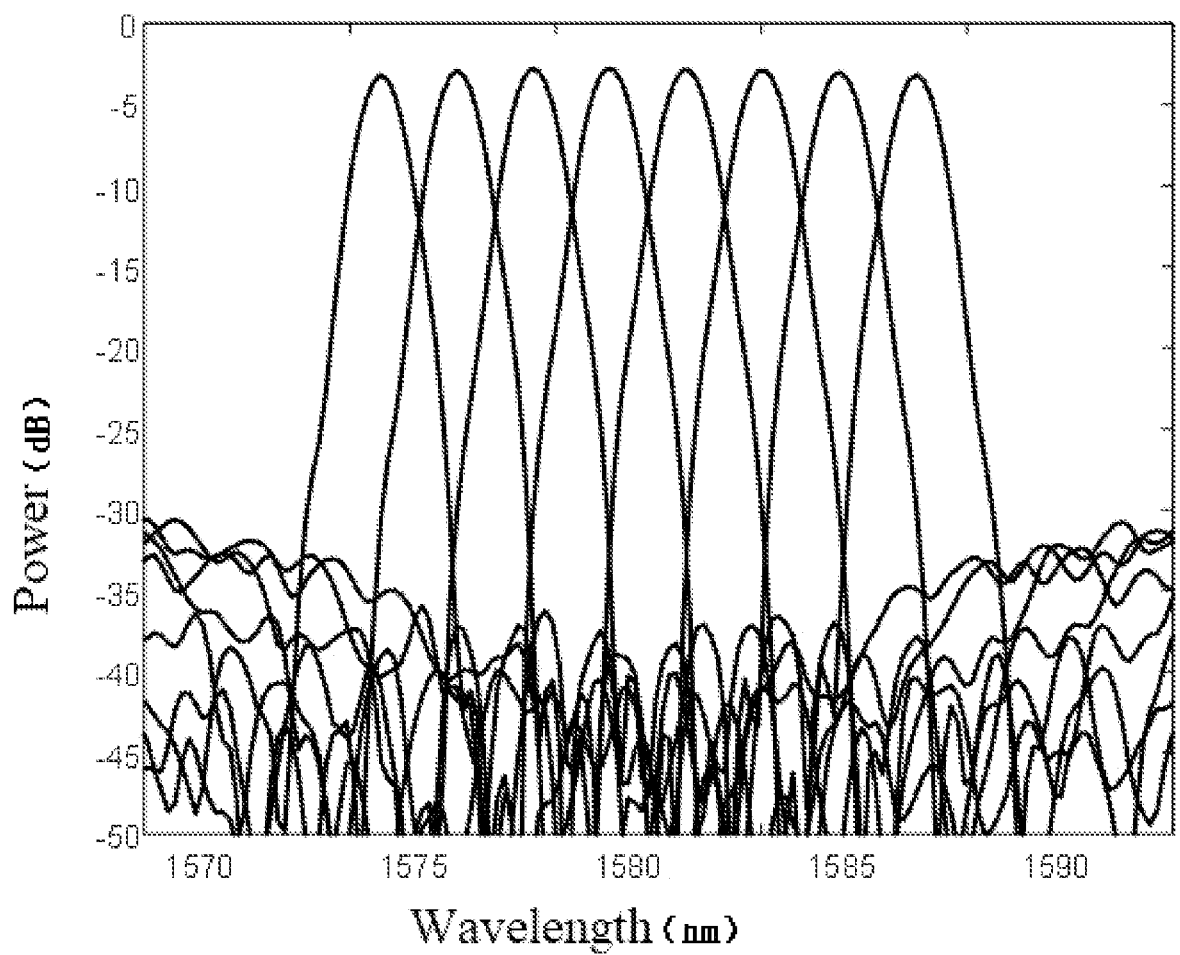

FIG. 3 shows a transmission response of the super-compact AWG wavelength division multiplexer based on the sub-wavelength grating according to the present invention.

DETAILED DESCRIPTION OF THE EMBODIMENTS

The present invention is further described in detail in combination with the drawings and the specific implementation method.

As shown in FIG. 1, according to the present invention, a super-compact AWG wavelength division multiplexer based on a sub-wavelength grating includes the input waveguide 1, the first planar waveguide 2, the sub-wavelength grating arrayed waveguide 3, the second planar waveguide 4, and the output waveguide 5 that are silicon-based devices and sequentially connected. The main functional structure is divided into three parts. The first part includes the input waveguide 1 and the output waveguide 5, the number of input channels is 1, and the number of output channels is 8, which are formed by strip waveguides. The second part is a free propagation region formed by the planar waveguides and is formed by two tangent circles, and the radius of a large circle is twice the radius of a small circle. The third part is the region of the sub-wavelength grating arrayed waveguide 3 where a relative delay inequality is introduced, and interference occurs in the second planar waveguide 4 to complete a wavelength division multiplexing function.

The sub-wavelength grating arrayed waveguide 3 includes 50 strip sub-wavelength gratings, and each of the sub-wavelength gratings is configured as an equivalent uniform strip waveguide. The group refractive index $n_g$ is significantly increased by using the slow light effect. When the group refractive index increases, a small planar waveguide can be configured to achieve light diffraction and focusing, thus reducing the number of arrayed waveguides required by the structure to finally reduce the overall structure size. The design proposed by the present invention realizes the wavelength division multiplexing function in a small size and obtains a fine channel spacing (such as reducing from 400 GHz to 200 GHz). As shown in FIG. 2, the sub-wavelength grating used in the present invention has a period of 347 nm and a duty ratio of 0.4.

The length difference $\Delta L$ of adjacent strip sub-wavelength gratings is calculated according to the following formula:

$$\Delta L = \frac{m\lambda_0}{n_c},$$

where m denotes the diffraction order of AWG, $\lambda_0$ denotes a central wavelength, and $n_c$ denotes the mode effective refractive index of arrayed waveguides. In addition, to achieve the low-loss transmission of incident light in the waveguide, the waveguide TE fundamental mode is adopted in the overall design. However, according to the principle of mode matching, the mode mismatch caused by a sudden change in the width of the waveguide may cause many high-order modes to be excited and phase errors may be introduced. Therefore, a parabolic taper waveguide is introduced at the connection between the strip waveguide and the free propagation region waveguide, which broadens the width of the waveguide, reduces the refractive index difference between the two waveguides, and reduces the introduction of phase error.

The key parameters in the overall design are the radius R of the planar waveguide formed by the Rowland circle and the diffraction order m of the AWG, which satisfies the following two formulas:

$$R \geq \frac{d_{io} n_s d_g N_{ch}}{\lambda_0},$$

$$m \leq \frac{\lambda_0 n_c}{N_{ch} \Delta \lambda n_g},$$

where $d_{io}$ denotes the distance between input and output waveguides, $n_s$ denotes the mode effective refractive index of the free propagation region waveguide, $d_g$ denotes the distance of the arrayed waveguides, $N_{ch}$ denotes the number of output channels, $\lambda_0$ denotes the central wavelength, $n_c$ denotes the mode effective refractive index of the arrayed waveguides, $\Delta \lambda$ denotes the channel spacing, and $n_g$ denotes the mode group refractive index of the arrayed waveguides.

In the present design, the distance of output waveguides is 1.5 μm, the distance of arrayed waveguides is 1.5 μm, the width of arrayed waveguide is 1 μm, the diffraction order m is 10, and the radius of Rowland circle is 94.2 μm. Therefore, based on these parameters, the radius limit caused by the non-uniformity degree is verified:

$$R \geq \frac{N_{ch} d_{io}}{2\theta_0} \sqrt{\frac{8.686}{L_u}},$$

where $N_{ch}$ denotes the number of output channels; the channel flatness parameter (i.e. non-uniformity degree parameter) $L_u \approx 8.686 \theta_{max}^2/\theta_0^2$, Gaussian far-field equivalent width $$\theta_0 = \frac{\lambda}{n_s w_g \sqrt{2\pi}},$$

$\theta_{max}$ denotes a far-field diffraction angle, and $w_g$ denotes the equivalent width of arrayed waveguide mode field.

Additionally, there is a fixed product relationship between the radius of the Rowland circle and the diffraction order, and the relationship can be expressed as follows:

$$mR = \frac{d_{io} n_s d_g n_c}{\Delta \lambda n_g}.$$

It can be seen that when the group refractive index $n_g$ increases, the overall mR product decreases. The number of arrayed waveguides required is also reduced, and the overall size of the device is reduced.

In the overall design, the sub-wavelength grating is configured as the arrayed waveguide, the taper waveguide is configured as a connecting waveguide, and the key parameters are selected reasonably. The final design result is shown in FIG. 3, and the minimum adjacent channel crosstalk is less than −27 dB.

In conclusion, the present invention has the following characteristics: 1. The sub-wavelength grating AWG structure realizes the wavelength division multiplexer with a channel spacing of 200 GHz and an output of 8 channels; 2. By the slow light effect of the sub-wavelength grating, the size of the Rowland circle and the number of arrayed waveguides are reduced comprehensively, and the super-compact device is realized. On the premise of keeping the balance between the device performance and the overall size, the overall size of the device is controlled within 300×230 μm², and the area is only 0.7 mm².

What is claimed is:

1. A super-compact arrayed waveguide grating (AWG) wavelength division multiplexer based on a sub-wavelength grating, comprising an input waveguide, a first planar waveguide, a sub-wavelength grating arrayed waveguide, a second planar waveguide, and an output waveguide, wherein the input waveguide, the first planar waveguide, the sub-wavelength grating arrayed waveguide, the second planar waveguide, and the output waveguide are silicon-based devices and sequentially connected;

the input waveguide has 1 port, and the output waveguide has 8 ports;

the sub-wavelength grating arrayed waveguide comprises 50 strip sub-wavelength gratings with a same length difference $\Delta L$; each of the 50 strip sub-wavelength gratings is configured as an equivalent uniform waveguide;

the first planar waveguide and the second planar waveguide each have a basic structure of a Rowland circle, wherein the Rowland circle comprises a circle with a radius of R and an inscribed circle with a radius of R/2, and the first and second planar waveguides are symmetrically designed.

2. The super-compact AWG wavelength division multiplexer according to claim 1, wherein a width of strip sub-wavelength gratings is 1 μm, and a diffraction order is 10; and a distance between adjacent strip sub-wavelength gratings is 1.5 μm.

3. The super-compact AWG wavelength division multiplexer according to claim 1, a standard silicon on insulator (SOI) wafer design is employed, wherein a substrate and an upper cladding layer are each configured with a material of silicon dioxide in a thickness of 2 μm, and a main waveguide grating structure is configured with a material of silicon in a thickness of 220 nm.

4. The super-compact AWG wavelength division multiplexer according to claim 1, the length difference $\Delta L$ of adjacent strip sub-wavelength gratings is calculated according to the following formula:

$$\Delta L = \frac{m\lambda_0}{n_c},$$

wherein m denotes a diffraction order of AWG, $\lambda_0$ denotes a central wavelength, and $n_c$ denotes a mode effective refractive index of arrayed waveguides.

5. The super-compact AWG wavelength division multiplexer according to claim 1, the radius R of each of the first and second planar waveguides and a diffraction order m of the AWG satisfy the following two formulas, wherein each of the first and second planar waveguides is formed by the Rowland circle:

$$R \geq \frac{d_{io} n_s d_g N_{ch}}{\lambda_0},$$

$$m \leq \frac{\lambda_0 n_c}{N_{ch} \Delta \lambda n_g},$$

wherein $d_{io}$ denotes a distance between input and output waveguides, $n_s$ denotes a mode effective refractive index of a free propagation region waveguide, $d_g$ denotes a distance of arrayed waveguides, $N_{ch}$ denotes a number of output channels, $\lambda_0$ denotes a central wavelength, $n_c$ denotes a mode effective refractive index of the arrayed waveguides, $\Delta \lambda$ denotes a channel spacing, and $n_g$ denotes a mode group refractive index of the arrayed waveguides.

* * * * *